United States Patent [19]

Ku

[11] 3,989,500

[45] Nov. 2, 1976

[54] METHOD OF REGULATING PLANT GROWTH

[75] Inventor: Han San Ku, Painesville, Ohio

[73] Assignee: Allied Chemical Corporation, Morristown, N.J.

[22] Filed: Nov. 25, 1974

[21] Appl. No.: 526,753

Related U.S. Application Data

[63] Continuation-in-part of Ser. No. 267,309, June 29, 1972, abandoned.

[52] U.S. Cl. .......................................... 71/28; 71/1; 71/99; 71/120
[51] Int. Cl.² .......................................... C05C 9/00
[58] Field of Search ............... 71/1, 28, 76, 99, 119, 71/120

[56] References Cited

UNITED STATES PATENTS

| | | | |
|---|---|---|---|
| 3,450,703 | 6/1969 | Petersen | 71/28 |
| 3,452,017 | 6/1969 | Petersen | 71/28 |
| 3,556,766 | 1/1971 | Mitchell | 71/120 |
| 3,701,807 | 10/1972 | Chupp | 71/99 |
| 3,712,914 | 1/1973 | Tilles | 71/99 |

OTHER PUBLICATIONS

C.A., vol. 71, 1969, pp. 318–319, 123014f, Shirshkov et al., U.S.S.R.

C.A., vol. 61, 1964, 7027h, Karanov et al.

Planta, 68, 292–296, 1966, Kefford et al., Cytokin Act of Phenylurea Derivatives, Bud Growth.

*Primary Examiner*—Charles N. Hart
*Assistant Examiner*—Ferris H. Lander
*Attorney, Agent, or Firm*—Arthur J. Plantamura; Jack B. Murray, Jr.

[57] ABSTRACT

A method of improving the yield of plants, particularly crop plants, such as legumes and cotton, by the application to the plants of an effective amount of at least one compound selected from the group consisting of substituted thioureas having the formula:

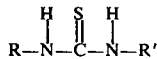

wherein R and R' are the same or different and are aliphatic hydrocarbon of 1 to 12 carbon atoms and aromatic hydrocarbon up to 12 carbon atoms.

12 Claims, No Drawings

METHOD OF REGULATING PLANT GROWTH

CROSS-REFERENCE TO RELATED APPLICATIONS

This application is a continuation-in-part of our application Ser. No. 267,309, filed June 29, 1972, now abandoned.

BACKGROUND OF THE INVENTION

This invention is directed to compounds and compositions having a growth regulating effect on plants when applied according to the method of the present invention. The method and compositions disclosed are of particular value for increasing the yield per plant and per acre of crops such as legumes and those of the genus Gossypium.

SUMMARY OF THE INVENTION

The growth rate and yield of certain plants, particularly crop plants such as legumes and those of the genus Gossypium, can be improved advantageously by applying to the plants an effective amount of at least one compound selected from the group consisting of substituted thioureas having the formula (I):

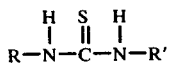

where R and R' are the same or different and are aliphatic hydrocarbons of 1 to 12 carbon atoms and aromatic hydrocarbon up to 12 carbon atoms.

Typical examples of the radicals R and R are: alkyl of 1 to 12 carbon atoms, e.g. methyl, pentyl, hexyl, isopropyl, and dodecyl; alkenyl of 2 to 12 carbon atoms, e.g. vinyl, 2-butenyl and 3-dodecyl; alkynyl of 2 to 12 carbon atoms, e.g. ethynyl, 3-butynyl and 4-octynyl; aryl; aralkyl of 7 to 12 carbon atoms, e.g. benzyl, 3-phenylpropyl and 6-benzylheptyl; alkaryl of 7 to 12 carbon atoms, e.g. tolyl, diisopropylphenyl and 2,5-diethylphenyl; and alkyl substituted aralkyl of 8 to 12 carbon atoms, e.g. 4-butylbenzyl, 2-methylbenzyl and 4-(3-isopropylphenyl)benzyl. Preferred compounds of the present invention are those defined by formula (I) wherein R and R' are independently selected from the group consisting of lower aliphatic hydrocarbon (i.e. aliphatic hydrocarbon of 1 to 6 carbon atoms), aralkyl hydrocarbon of 7 to 12 carbon atoms and alkyl-substituted aralkyl hydrocarbons of 8 to 12 carbon atoms.

Examples of the above group are:

(1) 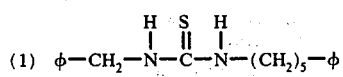

(2) 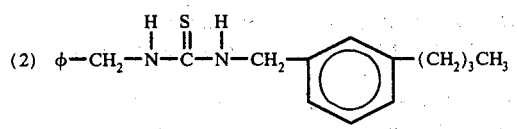

(3) 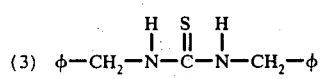

(4) 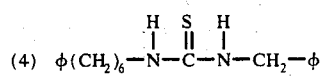

(5) 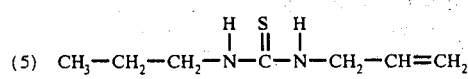

Thioureas which come within the group and have been found especially effective are 1,3-diallyl-2-thiourea.

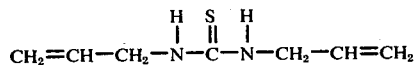

and 1,3-dibenzyl-2-thiourea

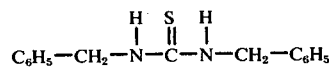

The application of these growth regulators have several beneficial effects. They improve the "lodging index." Lodging is the term applied to plants which angle over close to the ground, hence the tendency of a plant to remain upright due to the effect of the growth regulators of the present invention, permits more effective harvesting. The regulators also appear to effect some increase in the protein and oil content of the harvested plant. The yield per plant may be improved as much as 30 percent, as well as the yield per acre, as compared to untreated control plantings. Both the size of the plant, and the number and size of the fruit and seed is increased by the proper application of these growth regulators.

DESCRIPTION OF THE PREFERRED EMBODIMENT

According to the method of the present invention, the yield of certain plants, particularly crop plants can be improved by applying to the plant an effective amount of at least one of the substituted thioureas of the present invention. The plants for which the present invention has been found especially adapted include crop plants such as legumes e.g. soybeans, peas, peanuts and clover, plants of the genus Gossypium (e.g. cotton).

The substituted thioureas may be applied to the foliage, preferably between the period of early flowering and early maturation of the fruit, and most preferably in the early flowering stage, as a spray containing between 1 and 7000 parts per million (ppm), preferably between 500 and 2500 ppm of the active thiourea in a non-phytotoxic solvent, preferably water. In the case of a soybean-crop with plants spaced 6 to the foot in 20 inch rows, the application may be about 100 to 500 grams of active ingredient per acre, preferably about 150 to 350 grams.

For convenience, concentrates may be prepared which can be diluted with water in the field. Water, however, is the preferred diluent used in the field. In the case of relatively insoluble active ingredients, an emulsion or suspension in water containing between about 0.01 to 0.1% by weight of an emulsifier such as Tween 20, which is a sorbitan monooleate polyoxyalkylene derivative, can be prepared.

In the case of acetone-soluble active ingredients which are not wholly soluble in water, acetone, which is also non-phytotoxic, can be used as required, to effect a complete solution when preparing the concentrate.

The effectiveness of the application is particularly enhanced if there is also incorporated into the solution of the thiourea, a minor amount of a sticking agent and spreading agent or surfactant. The first serves to increase the retention time of the active ingredient on the foliage, thereby reducing the number of applications required for a comparable effect, the second to improve wetting, thus insuring good delivery of the active ingredient to all parts of the plant and prevention of build-up of high concentrations which might produce leaf burn.

The sticking agent may be present in an amount ranging from about 0.1 to 1 pound per 100 gallons of solution. Although many commercial non-phytotoxic agents are applicable, a readily emulsified oxidized waxy polymer of ethylene as characterized in U.S. Pat. No. 2,976,210 (issued Mar. 21, 1961) has been found quite satisfactory. The water soluble, non-ionic surface active agents set forth in U.S. Pat. No. 2,846,398 (issued Aug. 5, 1968) have also been found satisfactory.

These growth regulators can also be applied as wettable dusting powders, using solid extending agents either of an organic or inorganic nature. To this end, solutions of the regulators may be absorbed on a variety of solid carriers, the absorbent clays such as bentonite being especially preferred.

One application of the growth regulators of the present invention when applied between the early flowering stage and early maturation of the fruit will provide an appreciable improvement in the yield and characteristics, but two or more applications can be made, and are particularly advantageous if rain follows the first or subsequent applications. The most convenient means of applying the growth regulators is spraying by airplane. In areas where aerial spraying is impractical, however, the solutions can be effectively sprayed from trucks, or with hand spraying equipment.

It should also be noted that additional compatible biologically active ingredients can be added to the plant growth regulators of the present invention, if desired, to thus obtain two or more benefits from a single application.

The method and composition of the present invention may be further illustrated by reference to the following examples.

EXAMPLE 1

Two hundred soybean plants (Amsoy) are grown in soil, in 4 inch pots in an experimental greenhouse. The environment is maintained at standard greenhouse conditions, i.e. at a temperature of 75° F. during the day, and 65° F. at night. The summertime peak temperature is 85° F. Supplemental light is used to maintain a 12 hour day and deionized water is applied as needed.

For the test, growth regulating solutions are prepared by first preparing concentrates consisting of: (a) 5 grams of 1,3-dially-2-thiourea in water made up to 100 cc, and (b) 5 grams of 1,3-dibenzyl-2-thiourea in water made up to 100 cc. In each case, 20 cc of the concentrate is diluted to 1 liter with water to obtain a solution containing 1000 parts per million (ppm) of the specific growth regulator per cc. In addition, (c) a suspension of 5.0 grams of calcium malonate is prepared in 90 cc of deionized water. 0.1 Gram of "Tween 20" is stirred into the solution to stabilize suspension which is then made up to 100 cc so that each cc contains 5 mg. of the calcium malonate. 20 cc of this concentrate is now diluted to 1 liter.

Fifty of the soybean plants are sprayed with the diallyl thiourea solution and 50 with the 1,3-dibenzyl-2-thiourea solution at the third trifoliate stage, each plant receiving about 2.5 cc of the solution, or about 2.5 mg. A third group of 50 soybean plants are sprayed with a 50-50 mixture of solution (a) and (c), (1,3-diallyl-2-thiourea and calcium malonate). Each plant receives about 2.5 cc of the mixture, or about 2.5 mg. of the combined growth regulators. The remaining plants are sprayed with deionized water as controls.

Four and one-half weeks after the foliar treatment the soybean plants are harvested.

The average weight of the plants as compared with the average of the controls, are set forth in Table I below:

TABLE I

|  | Fresh Weight Grams | Dry Weight Grams | Percent |
|---|---|---|---|
| Control | 30.5 | 5.74 | 100 |
| 1,3-dibenzyl-2-thiourea (1000 ppm) | 31.3 | 7.08 | 123 |
| 1,3-diallyl-2-thiourea (1000 ppm) | 31.5 | 7.12 | 124 |
| Calcium malonate (1000 ppm) with 1,3-diallyl-2-thiourea (1000 ppm) | 35.6 | 7.79 | 136 |

It appears that when a mixture of the two plant regulators, calcium malonate disclosed in my co-pending application, "Plant Growth Regulators and Method of Application", attorney's docket No. 7000-1011, and 1,3-diallyl-2-thiourea are applied as a mixture, they display a synergistic effect, being somewhat more effective in combination than either regulator alone. The mixture may range from 10% of the calcium malonate to 90% of a thiourea, to 90% of the calcium malonate to 10% of a thiourea.

EXAMPLE 2

Several acres of a New Jersey field are sown with soybeans (Amsoy). The rows are 20 inches apart with about 6 plants per foot in rows.

Concentrates of 1,3-dibenzyl-2-thiourea and of 1,3-diallyl-2-thiourea are prepared by dissolving 170 grams of each growth regulator in water, together with 30 grams of "Plyac" (an emulsion of an oxidized waxy polymer of ethylene) as a sticking agent (U.S. Pat. No. 2,976,210, issued Mar. 21, 1961) and 30 grams of sodium lauryl sulfate as a spreading agent. The solutions are then diluted to 3100 cc to produce two concentrates, each of which is subsequently diluted in the field to 40 gallons.

These sprays are each applied evenly to the foliage of one acre of the soybean plants at the early flowering stage, thereby consuming both 40 gallon quantities.

Because of rain, a similar spray is applied twice more before the early maturation of the fruit.

The crop is harvested at the end of a five week period, and compared to another acre of the same field which has been sprayed with water simultaneously with the spraying of the test fields to thus serve as a control.

The results are as set forth in Table II:

TABLE II

|  | Control | 1,3-diallyl-2-Thiourea | 1,3-Dibenzyl-2-Thiourea |
|---|---|---|---|
| Lodging Index | 3.4 ± 1.2 | 2.3 ± 1.0 | 1.7 ± 1.1 |
| Percent Protein | 40.75 | 41.29 | 40.99 |
| Yield/Plant (grams) | 7.89 | 10.18 | 9.23 |
| Weight/100 Seeds | 17.58 | 18.23 | 17.51 |
| Bushels/Acre | 40 | 51.6 | 46.8 |
| Yield % Control | 100 | 129 | 117 |

Lodging Index: From observation. Plants flat on ground rated 5.0, standing upright 0.0 - Thus, the higher the number, the greater the cant of the plant.
Percent Protein: Kjeldahl determination of the protein content of the average seed, dry basis
Weight of 100 Seeds, dry basis.

EXAMPLE 3

1,3-dibenzyl-2-thiourea (50% by weight), attaclay (46% by weight) and marasperse CP (4% by weight), a highly purified sodium lignosulfonate, and thoroughly blended to yield of a wettable concentrate powder containing 50% by weight of active ingredient (ai). The wettable concentrate powder is dispersed in water and applied to soybeans ("Corsoy") as a foliar spray at a rate of 40 gallons per acre containing the active ingredient in the amounts indicated in Table III below. Plants are sprayed at the third trifoliate, first flowering, or first flowering plus 4 weeks stage of growth. They are permitted to mature under field conditions, and are harvested about 16 weeks after planting. Harvested beans from each plot, including untreated control plots, are weighed and recorded. Data obtained are reported in Table III below.

EXAMPLE 4

The active compound of this experiment is formulated as in Example 3 above. The wettable powder concentrate is then dispersed in water and applied to cotton as a foliar spray at a rate of 27.5 gallons per acre containing the active ingredient in the amounts indicated in Table IV below. Applications are made when approximately one-third of the plants have reached the flowering stage, or 4 weeks after one-third of the plants have reached the flowering stage. Approximately 5 months after planting, cotton seed is harvested from the plots, weighed, and the weights recorded. Cotton seed weights are reported in Table IV below for treated and untreated plots. These data show more than 6% increase in cotton seed yield from treated plots over the untreated controls.

TABLE III

| Compound | Application Rate (lb,ai/A) | | | Yield: lb/plot | | | | Average of Four Replicates |
|---|---|---|---|---|---|---|---|---|
| | Third Trifoliate | First Flower | First Flower + 4 weeks | I Replicate | II Replicates | III Replicates | IV Replicates | |
| 1-3-Dibenzyl-2-thiourea | ¾ | | | 4.5 | 2.7 | 4.3 | 5.4 | 4.2 |
| | 1 | | | 3.7 | 3.5 | 4.6 | 6.0 | 4.3 |
| | | 1 | | 3.0 | 3.7 | 4.8 | 4.4 | 4.0 |
| | | | 1 | 4.3 | 4.9 | 4.4 | 3.6 | 4.3 |
| | | 1 | 1 | 4.7 | 3.1 | 3.2 | 4.6 | 3.9 |
| | 1 | | 1 | 6.1 | 5.7 | 3.8 | 2.3 | 4.5 |
| Control | | | | 2.3 | 3.3 | 3.8 | 3.0 | 3.1 | ai = active ingredient

TABLE IV

| Compound | Application Rate (lb,ai/A) | | Yield: lb seed/acre | | | | Average of Four Replicates | % Change Over Control |
|---|---|---|---|---|---|---|---|---|
| | One-third Flower | One-third Flower + 4 Weeks | I Replicate | II Replicates | III Replicates | IV Replicates | | |
| Dibenzyl-thiourea | 1 | | 1960.2 | 1938.4 | 2134.4 | 1938.4 | 1992.9 | +6.4 |
| | | ¾ | 1938.4 | 1742.4 | 2134.4 | 2178.0 | 1998.3 | +6.7 |
| Control | | | 1968.8 | 1690.2 | 1960.2 | 1873.1 | 1873.1 | | ai = active ingredient

While the above describes the preferred embodiment of my invention, it will be understood that departure may be made therefrom within the scope of the specification and claims.

I claim:

1. A method for improving the yield of plants comprising applying to the plant an effecitve amount of a compound selected from the group consisting of substituted thioureas having the formula:

R—NH—CS—NHR' where R and R' are the same or different, and are aliphatic hydrocarbon of 1 to 12 carbon atoms and aromatic hydrocarbon up to 12 carbon atoms.

2. The method of claim 1 wherein the substituted thiourea is applied to the plant between the period of early flowering and early maturation of the fruit.

3. The method of claim 1 wherein the thiourea is 1,3-dibenzyl-2-thiourea.

4. The method of claim 1 wherein the thiourea is 1,3-diallyl-2-thiourea.

5. The method of claim 1 wherein the plant is a member selected from the group consisting of legumes and cotton.

6. The method of claim 1 wherein R and R are the same or different, and are lower aliphatic hydrocarbon, aralkyl of 7 to 12 carbon atoms and alkyl-substituted aralkyl of 8 to 12 carbon atoms.

7. A plant growth composition comprising a compound selected from the group consisting of a thiourea having the formula

R—NH—CS—NHR' where R and R' are the same or different and are aliphatic hydrocarbon of 1 to 12 carbon atoms and an aromatic hydrocarbon up to 12 carbon atoms, present to the extent of between about 1 and 7000 parts per million in a non-phytotoxic solvent.

8. The plant growth composition of claim 7 wherein R and R' shall at least contain an unsaturated or aromatic group.

9. The plant growth composition of claim 7 containing additionally a minor amount of a sticking agent or a spreading agent.

10. The method of applying a plant growth composition which comprises spraying the composition of claim 7 on legumes between the period of early flowering and early maturation of the fruit.

11. A method for improving the yield of legumes comprising applying to the plant between the period of early flowering and early maturation of the fruit, an effective amount of a mixture of calcium malonate and a thiourea selected from the group consisting of 1,3-dibenzyl-2-thiourea and 1,3-diallyl-2-thiourea.

12. A plant growth composition comprising a mixture of calcium malonate and a thiourea selected from the group consisting of 1,3-dibenzyl-2-thiourea and 1,3-diallyl-2-thiourea.

* * * * *